No. 777,206. PATENTED DEC. 13, 1904.
J. J. HESER.
CORN PLANTER.
APPLICATION FILED JULY 29, 1904.
NO MODEL. 3 SHEETS—SHEET 2.
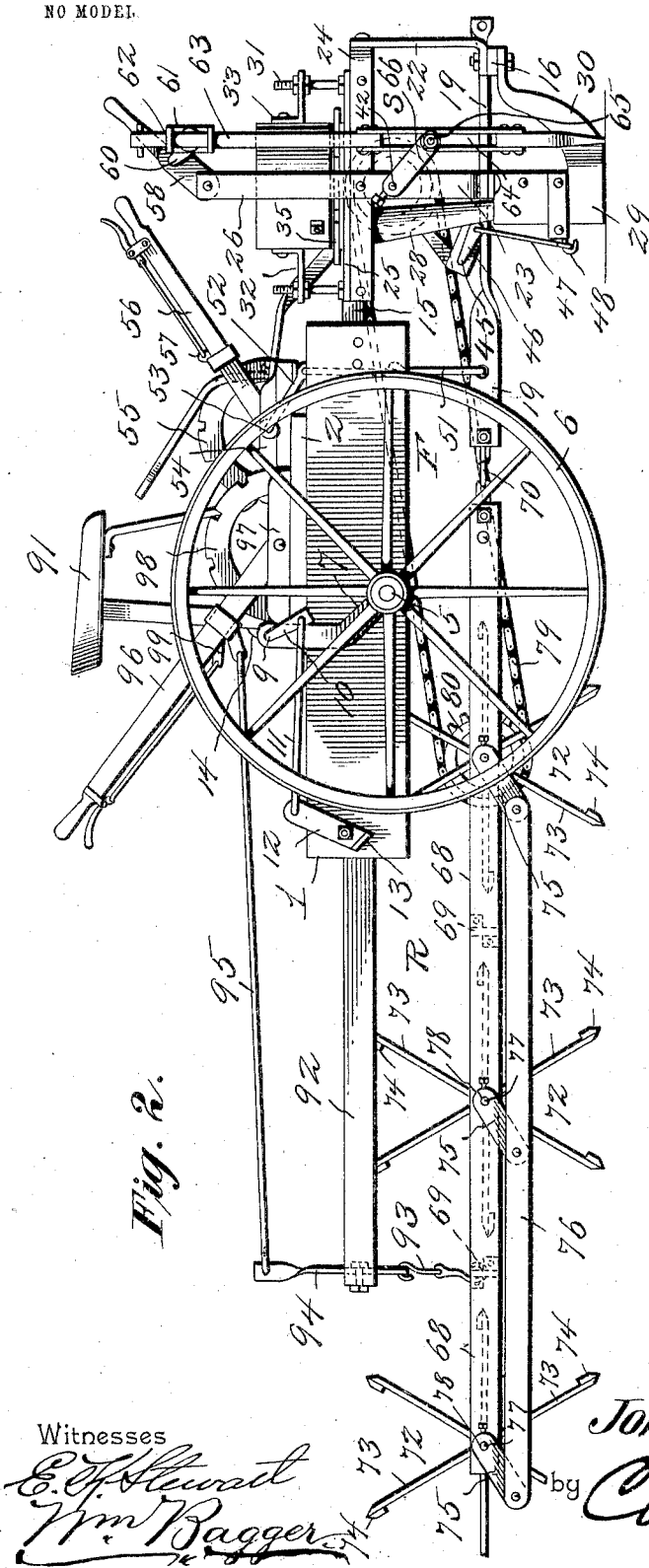
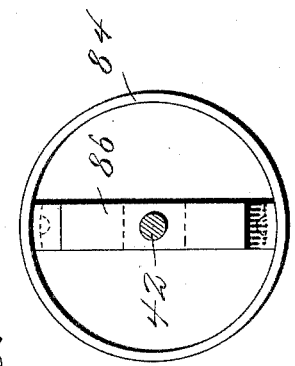
John J. Heser, Inventor

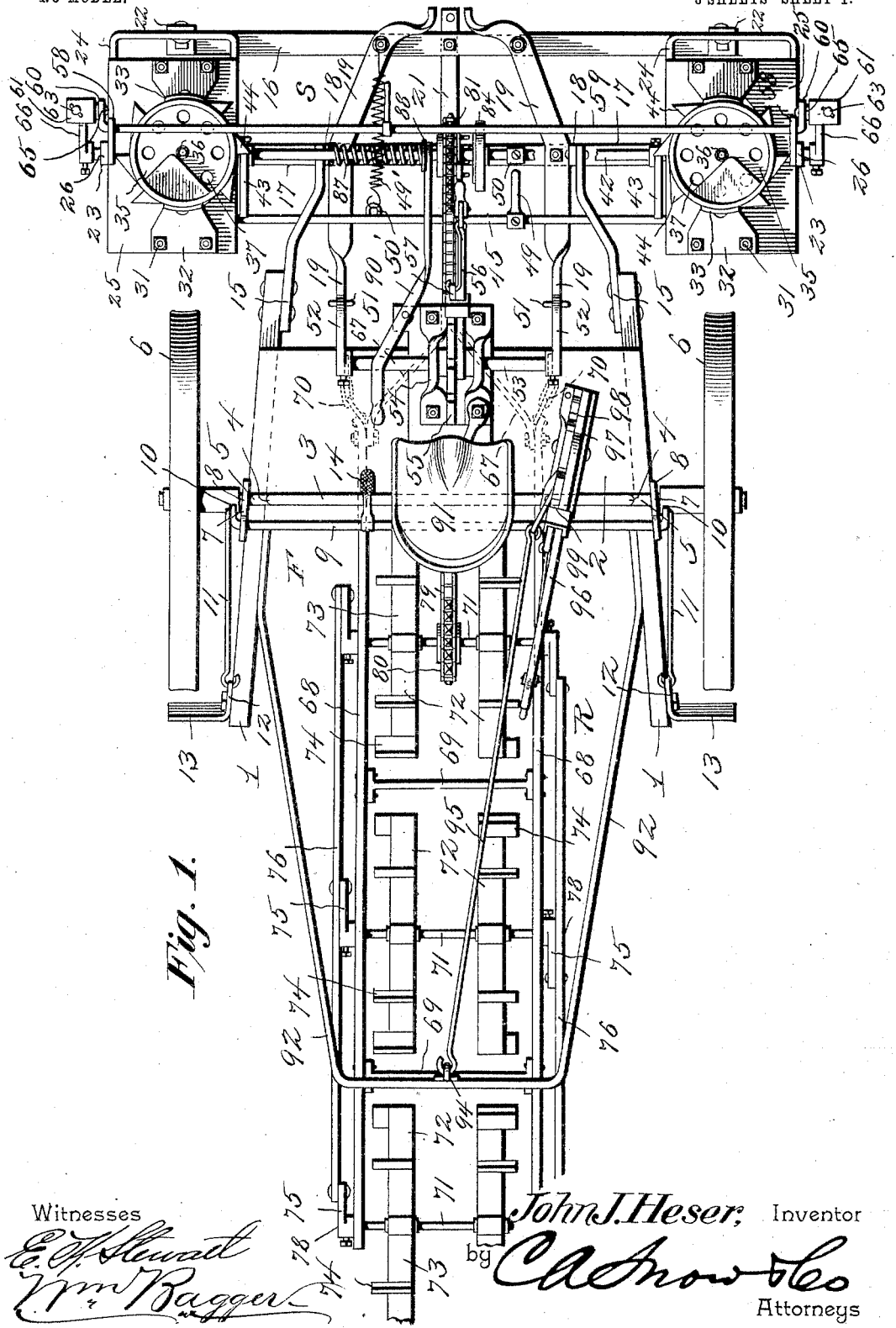

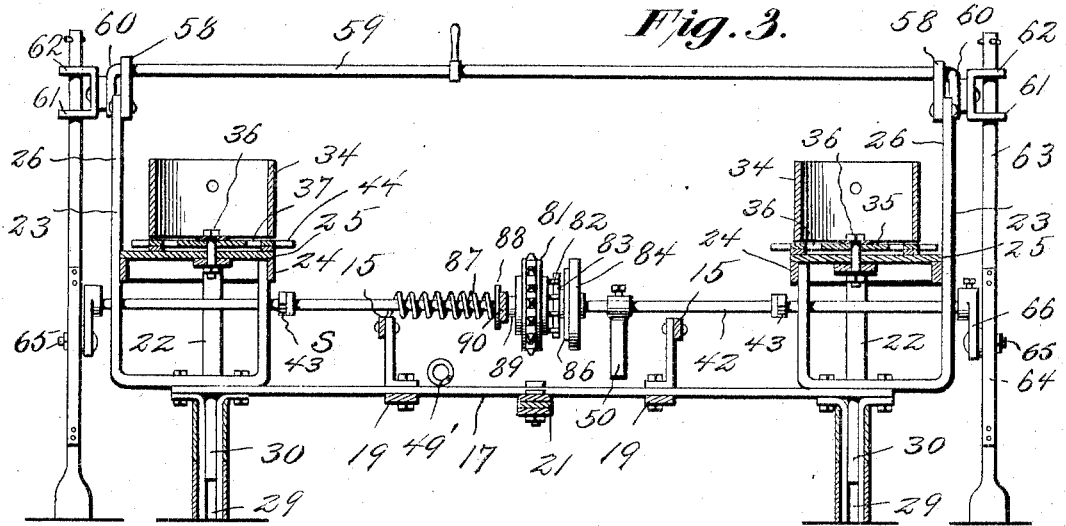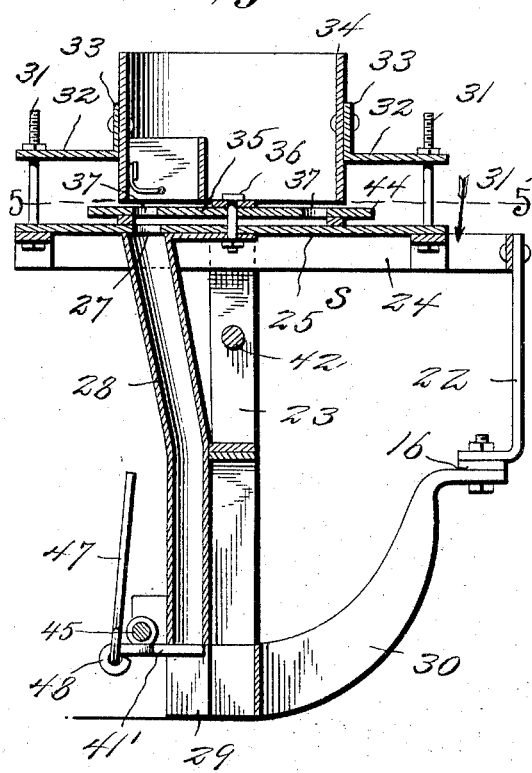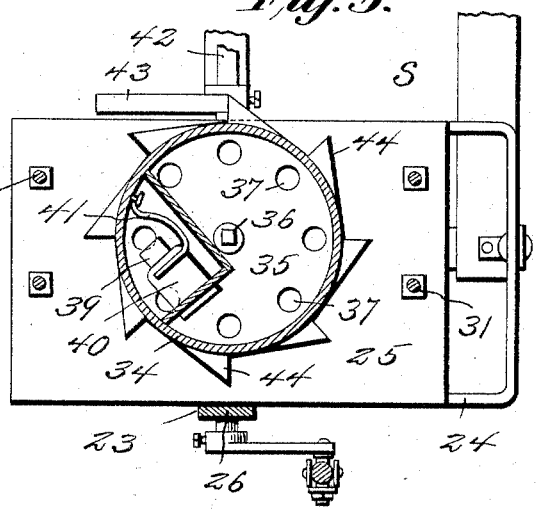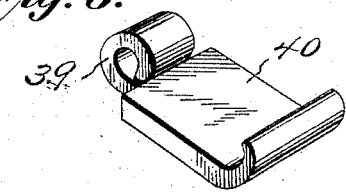

No. 777,206. Patented December 13, 1904.

UNITED STATES PATENT OFFICE.

JOHN J. HESER, OF JACKSON, MINNESOTA.

CORN-PLANTER.

SPECIFICATION forming part of Letters Patent No. 777,206, dated December 13, 1904.

Application filed July 29, 1904. Serial No. 218,704. (No model.)

*To all whom it may concern:*

Be it known that I, JOHN J. HESER, a citizen of the United States, residing at Jackson, in the county of Jackson and State of Minnesota, have invented a new and useful Corn-Planter, of which the following is a specification.

This invention relates to check-row corn-planters; and it has particular reference to that class of check-row corn-planters which may be operated without necessity of stretching a line of wire across the field for the purpose of actuating the seed-dropping mechanism as the machine passes across the field, as well as for the purpose of guiding the machine along parallel lines, the tappet line or wire being shifted at the end of each row.

The present invention has for its object to provide a machine of this class which shall be simple in construction, durable, and inexpensive, in which means shall be provided for driving the seeding mechanism with absolute certainty and without danger of slipping, whereby the deposits of seeds would be brought out of alinement with each other, and thus interfere with successful cross-row cultivation.

With these and other objects in view, which will readily appear as the nature of the invention is better understood, the same consists in the improved construction and novel arrangement and combination of parts which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that any changes, alterations, and modifications which come fairly within the scope of the invention and which may be resorted to without departing from the spirit or sacrificing the utility of the same are included.

In said drawings, Figure 1 is a top plan view of a check-row corn-planter constructed in accordance with the principles of the invention. Fig. 2 is a side elevation of the same. Fig. 3 is a transverse vertical sectional view taken through the seeder-frame. Fig. 4 is a vertical sectional view taken longitudinally through one of the seed-hoppers and related parts. Fig. 5 is a horizontal sectional view taken on the line 5 5 in Fig. 4. Fig. 6 is a perspective detail view showing the seed-forcing plunger 39 and its stem 40 in an inverted position, and Figs. 7 and 8 are detail views illustrating the construction of the clutch mechanism whereby motion is transmitted to the main operating-shaft 42.

Corresponding parts in the several figures are indicated by similar characters of reference.

In the construction of the preferred form of the invention is included a frame F, composed mainly of two side pieces 1 1 and a deck or platform 2, spacing and connecting said side pieces. An axle 3, disposed on the level of the platform 2, is provided with cranks 4 4, lying adjacent to the inner sides of the side pieces 1 1 and provided with spindles 5, projecting through said side pieces and carrying the ground-engaging supporting-wheels 6. Brackets 7, having collars 8, affording supports for the inner ends of the hubs of the transporting-wheels, are secured exteriorly to the side pieces and the upper ends of said brackets afford bearings for a rock-shaft 9, having cranks 10, which are connected by links 11 with rocking arms 12, secured pivotally to the sides of the frame and provided with cleaners 13, which by operating a treadle 14 upon the rock-shaft 9 may be held in engagement with the rims of the ground-engaging wheels, thereby freeing the latter from adhering dirt, clay, and the like in order that the progress of the machine may be even and unimpeded.

The front ends of the side frame-pieces 1 1 are provided with forwardly-extending brackets 15, which serve to support a frame S, carrying furrow-openers. The said frame, which constitutes the runner-frame, may be described as consisting, essentially, of a pair of parallel cross-bars 16 17, the rear one of which, 17, is provided with upwardly-extending lugs 18, to which are pivotally connected the front ends of the brackets 15. The frame S, in addition to the bars 16 and 17, is composed of a pair of longitudinally - disposed forwardly-converging frame-bars 19, constituting hounds, between the front ends of which a draft bar or pole may be secured. The frame-bars 16 17 are also connected by a centrally-disposed longitudinal bar 21, the front end of which extends under the converging ends of the hounds and affords a support for a draft beam or tongue. The ends of the frame S are provided with upwardly-extending brackets 22 and 23, rising, respectively, from the front bar 16 and the rear bar 17, serving as supporting means for horizontally-disposed yokes or frames 24, supporting the base-plates and seed devices 25. The brackets are in the nature of yokes, the outer arms 26 of which are extended upwardly above the base-plates and the hoppers supported upon the latter for purposes to be hereinafter described. Each of the base-plates is provided with an opening 27, which is in alinement with the downwardly-extending seed-tube 28, whereby the seed is conveyed into the shoe 29 of the furrow-opener 30, the front end of which is pivotally connected with the front bar 16 of the frame S. Each of the base-plates is provided near its front and rear ends with uprights 31, supporting at a suitable elevation above the base-plate flange-plates 32, having upwardly-extending segmental flanges 33, between which the hopper 34 is suspended. These hoppers, which are cylindrical in shape, are suspended or supported at a sufficient distance above the base-plate for the accommodation of the seed-disks 35, which are mounted rotatably upon pintles 36, which extend upwardly from the base-plates within the hoppers, with which they are concentric, so that the seed-cups 37, which are formed in annular series in the seed-disks, shall successively pass into registry with the opening 27 when said seed-disks are rotated. Within each of the hoppers is disposed a cut-off consisting of an approximately triangular casing, the lower edges of the side walls of which are practically in contact with the upper face of the seed-disk, thereby preventing any surplus of seeds from being carried by the seed-cups to the opening through which the seeds are expelled by means of a plunger 39, formed at the end of a stem 40, which is hingedly connected with the cut-off casing and which is actuated in a downward direction by a suitably-arranged spring 41, which while not interfering with the passage of the contents of the seed-cup under the plunger-head will cause such contents to be forced in a downward direction into and through the opening 27 and thence through the seed-tube 28. In the bottom of the seed-tube is disposed a foot-valve 41', upon which the seeds are dropped and which serves to retain the seeds in position until the operation of the valve, which is accomplished in a manner to be presently described.

The yokes or standards 23 of the frame S are provided with bearings for a rotary operating-shaft 42, which is actuated by means to be hereinafter described and which carries near the ends thereof cams or tappets 43, adapted to engage the ratchet-teeth 44, formed upon the peripheries of the seed-disks, each of which is thus rotated to the extent of one tooth by each revolution of the shaft 42. The seed-cups in the disks 35 are disposed in alinement with the ratchet-teeth 44, and the relative arrangement of parts is such that each seed-disk after being partially rotated shall stop with one of the seed-cups in alinement with the opening 27 in the seed-plate.

The frame S is provided with bearings for a rock-shaft 45, the ends of which are provided with cranks 46, connected by links 47 with arms 48, extending rearwardly from the foot-valves 41', which latter are thus thrown open whenever the shaft 45 is rocked in its bearings, said rocking motion being accomplished by means of a cam 49, mounted adjustably upon said rock-shaft and adapted to be actuated by means of an arm or tappet 50, mounted upon the operating-shaft 42. The arm 50 extends from the rock-shaft 42 at a different angle than the tappets 43, so that the seed-disks and the foot-valves shall never be operated contemporaneously, the relative order of operation being determined by the adjustment of the cam 49 upon the rock-shaft 45, which latter may be actuated at any desired time between the intervals of the operation of the seed-disks by the tappet 43.

From the construction herein described it will be understood that when the main operating-shaft 42 is rotated by the progression of the machine over the field the seed contained in the hoppers will be carried by the seed-cups into alinement with the openings in the supporting-plates 25 and will be expelled through said seed-openings by the spring-actuated plungers into the seed-tubes, where they rest upon the valves 41' until the latter are actuated to deposit the seeds in the furrows formed by the furrow-openers. The valves 41' after being actuated to deposit the seeds will be instantly closed by the action of a retracting-spring 49', connecting an arm 50', extending radially from the rock-shaft, with some fixed point upon the frame S. The valves will thus be in position to receive and retain the next charge of seeds deposited thereon by the seeding mechanism proper.

The rear ends of the hound members 19 of the frame S are connected, by means of links 51, with cranks 52 at the ends of a rock-shaft 53, which is journaled in suitable bearings upon the deck or platform of the frame of the machine. These bearings, which are designated 54, also support a rack-segment 55, which is concentric with the rock-shaft 53, and upon the latter is secured a hand-lever 56, equipped with a suitably-operated pawl or dog 57, which by engaging the notches in the rack-segment 55 will serve to retain the hand-lever and the rock-shaft at any desired point of adjustment. It will be observed that by manipulating the lever 56 the entire runner-frame S and all its related parts may be rocked upon the axis formed by the pivotal connections of the supporting-brackets 15 with the uprights 18 of the runner-frame. This adjustment is available for the purpose of causing the furrow-openers and their related parts to operate at any desired depth in the soil, as will be readily understood.

The upwardly-extending bracket members 26 are provided with obliquely-disposed forwardly-extending lugs 58, affording bearings for a rock-shaft 59, the extremities of which are provided with rearwardly - extending cranks 60, adapted normally to rest upon the upper ends of the bracket members 26. The crank-arms 60 carry clips 61, the arms of which are provided with perforations 62 for the passage of vertically-movable marker-rods 63, which are provided near their lower ends with slots 64, working upon wrist-pins 65 at the ends of cranks 66, which are suitably supported upon the extremities of the operating-shaft 42. It will be seen that when the latter is rotated the marker-rods will receive a combined oscillatory and vertically-reciprocatory motion, whereby as they descend a plainly-visible opening will be made in the surface of the soil to afford a mark or indication whereby the operator may guide the machine when the latter has been turned at the end of a row and its course is being retraced over the field.

The rear end of the central member 21 of the frame S is provided with rearwardly-extending divergent arms 67, with which are pivotally connected the front ends of the side pieces 68 of a rearwardly-extending frame R, said side bars being suitably spaced and connected at intervals by means of cross-braces 69. The front ends of the side bars 68 are also connected, by means of links 70, with the rear ends of the hound member 19, so that free pivotal connection shall be established between the frames S and R, as will be readily understood. Journaled in the side members of the frame R are a plurality of shafts 71, each carrying a plurality—in the present instance a pair—of rotary earth-engaging members 72. These earth-engaging members have been shown as being composed each of a plurality of spokes 73, radiating from their respective shafts, with which they are firmly connected in any suitable manner, each of said spokes being provided at its outer extremity with a cross-piece 74, constituting an earth-engaging blade. The several shafts, 71 are provided at the ends thereof with cranks 75, connected by means of parallel bars 76, which are provided with perforations 77, engaging wrist-pins 78 upon the said shafts, which are thereby compelled to rotate in unison, this being assisted by the fact that the spokes or paddles of the wheel are so disposed that a spoke of each wheel shall engage the ground at precisely the same moment. Any desired number of these rotary ground-engaging members may be used, and the power of them all will be exerted equally to rotate the foremost shaft or axle 71, from which the power is derived for actuating the operating-shaft 42 of the machine. Motion is transmitted from the foremost shaft 71 to said operating-shaft 42 by means of a chain 79, leading from a sprocket-wheel 80 upon the shaft 71 and over a sprocket-wheel 81, which is mounted loosely upon the operating-shaft. The sprocket-wheel 81 is provided at the circumference thereof with a plurality of laterally-extending equidistantly-disposed pins 82, which are adapted to engage a cross-bar 83 of a wheel 84, which is mounted securely upon the operating-shaft 42 adjacent to the sprocket-wheel 81, as shown. The cross-bar 83 is provided with a block 85 and an offset arm 86, which will be readily guided into engagement with any two pins 82 of the wheel 81, but which does not preclude the engagement of the cross-bar 83 itself with the diametrically opposite pins 82 of the sprocket-wheel 81. The latter is movable longitudinally with relation to the axis of the operating-shaft, and it is also free to rotate upon the latter, a spring 87 being disposed to force said sprocket-wheel in the direction of the engaging wheel or clutch member 84. In order to disengage the sprocket-wheel having the pins 82 from the fixed wheel or clutch member 84, the hub of said sprocket-wheel may be provided with a collar 88, having an annular groove 89, engaged by a forked lever 90, fulcrumed at a suitable fixed point upon the frame of the machine or upon a bracket extending from said frame within convenient reach of the operator, whose seat 91 is suitably supported upon the frame of the machine.

Pivotally connected with the inner sides of the side members 11 of the main frame are the ends of the arms of a yoke 92, which extends rearwardly above the frame R, with which it is connected by means of a link connection 93. The yoke 92 is provided with an upwardly-extending arm 94, connected by a rod 95 with a hand-lever 96, which is fulcrumed to a suitable support 97, including a segment-rack 98, said hand-lever being provided with a suitably-operated dog or pawl 99, which may be placed in engagement with any desired notch of the rack 98 for the purpose of retaining the yoke 92, and with it the frame R, at any desired point of adjustment. It is obvious that by this mechanism, which is conveniently disposed adjacent to the driver's seat, the operator may conveniently raise the frame R from the ground. The entire runner-frame being likewise capable of being lifted or elevated from contact with the ground, it follows that the entire weight of the machine may at any time when desired be supported upon the transporting-wheels, thereby enabling the machine to be transported over roads without injury to the machine by shaking and jolting the operative parts and without injury to the roads by the earth-engaging power-wheels.

From the foregoing description, taken in connection with the drawings hereto annexed, the operation and advantages of this invention will be readily understood by those skilled in the art to which it appertains. The operation of the seeding mechanism and that of the markers has been already described, and it will be readily seen that the seed may be delivered from the hoppers and deposited in the furrows with the utmost precision and regularity. By moving the sprocket-wheel 81 out of engagement with the clutch-wheel or clutch member 84 the seeding mechanism may be instantly thrown out of operation when for any reason it shall be desired to do so. Reversely, it requires only a short movement of the clutch-operating lever, assisted by the spring 87, to restore the seeding mechanism to operative condition.

Much annoyance has been frequently experienced in machines of this kind in throwing the seeding mechanism into and out of gear and in positively driving the said seeding mechanism when the latter is actuated either by the transporting-wheels or by earth-engaging means which do not engage the earth very effectively and positively. In such cases the objection has been that the seed-dropping mechanism would not be actuated with the degree of certainty and regularity which is absolutely necessary in order to accomplish the desired results. By my invention a plurality of any desired number of rotary elements are provided which engage the earth with absolute certainty and which bring about the certain and absolutely effective operation of the seed-dropping mechanism. These results are accomplished in a manner which is not only simple and economical, but which is capable of absolute control without much exertion on the part of the operator, who without moving from his seat may throw the machine into or out of operation, or he may raise or lower the seeder-frame or the operating-frame independently of or in conjunction with each other, and he may, finally, by a simple pressure upon the treadle provided for the purpose operate the rock-shaft carrying the cleaners or scrapers which engage the rims of the transporting-wheels.

Having thus described the invention, what is claimed is—

1. In a corn-planter, a wheel-supported main frame, brackets extending forwardly from said frame, a runner-frame having upwardly-extending lugs connected pivotally with said brackets, a rotary shaft mounted in said runner-frame, earth-engaging means, other than the transporting-wheels for imparting motion to said shaft, and seed-dropping mechanism operated by the latter.

2. In a corn-planter, a wheel-supported main frame, brackets extending forwardly from the same, a runner-frame connected pivotally with said brackets, a driven shaft mounted in said runner-frame, seed-dropping mechanism including seed-disks provided at their perimeters with ratchet-teeth, seed-tubes, foot-valves disposed in the latter, tappets upon the driven shaft engaging and operating the seed-disks by the ratchets thereon, a rock-shaft disposed parallel to the driven shaft, an arm adjustable upon said driven shaft and engaging an arm upon the rock-shaft, a spring to restore the rock-shaft to normal position after being actuated by the arm upon the driven shaft, cranks at the extremities of the rock-shaft, and links connecting said cranks with rearwardly-extending arms of the foot-valves.

3. In a corn-planter, a wheel-supported main frame having forwardly-extending brackets, a runner-frame having upwardly-extending lugs connected pivotally with said brackets, a driven shaft in said runner-frame, seed-dropping mechanism actuated by said driven shaft, cranks at the extremities of the latter, a rock-shaft suitably supported above the seeding-boxes having cranks at the ends thereof, clips connected pivotally with said cranks, and markers vertically movable in said clips and operated by the driven shaft synchronously with the operation of the seed-dropping mechanism.

4. A wheel-supported main frame having forwardly-extending brackets, a runner-frame having upwardly-extending lugs connected pivotally with said brackets, a driven shaft mounted in said runner-frame, seed-dropping mechanism operated by said driven shaft, a rock-shaft supported above the seedboxes and having cranks at its extremities, clips connected pivotally with said cranks, markers mounted slidingly in said clips and having slots near the lower ends thereof and cranks at the extremities of the driven shaft, said cranks being provided with wrist-pins engaging the slots in the markers.

5. A wheel-supported main frame having forwardly-extending brackets, a runner-frame having upwardly-extending lugs connected pivotally with said brackets, yokes supported upon said runner-frame and having upwardly-extending arms, brackets extending upwardly from the runner-frame in front of said yokes, seed-dropping mechanism supported by said yokes and brackets, brackets extending obliquely in a forward direction from the upper ends of the yokes, a rock-shaft journaled in said brackets and having cranks adapted to be supported upon the upper ends of the arms of the yokes, clips connected pivotally with said cranks, markers mounted slidably in said clips and having slots near their lower ends, a driven shaft mounted in the runner-frame and adapted to actuate the seed-dropping mechanism, and cranks at the ends of said driven shaft having wrist-pins engaging the slots in the markers.

6. A wheel-supported main frame, a runner-frame connected pivotally and adjustably with said main frame and including a pair of forwardly-extending and converging hound members adapted for the attachment of a pole or draft-beam, a central longitudinal brace secured to the under side of the runner-frame and extended forwardly below the pole, and means including a rock-shaft, a hand-lever, a crank upon the rock-shaft, and a connecting-link for adjusting the position of the runner-frame with relation to the main frame.

7. A wheel-supported main frame having forwardly-extending brackets, a runner-frame having forwardly-extending lugs connected pivotally with said brackets, said runner-frame including a pair of hound members, and a power-frame carrying a plurality of rotary ground-engaging members, said power-frame having link connection with the rear ends of the hound members of the runner-frame.

8. A wheel-supported main frame, a runner-frame connected pivotally with said main frame and including hound members, and a central longitudinal member having rearwardly-extending divergent arms, a power-frame carrying a plurality of rotary ground-engaging members, the side members of said power-frame being pivotally connected with the divergent arms of the longitudinal member of the runner-frame, and link connections between the hound members of the latter and the side members of the power-frame.

9. A wheel-supported main frame, a runner-frame connected pivotally and adjustably with said main frame and including a pair of hound members and an intermediate longitudinal member having rearwardly-divergent arms, a power-frame including side members, and a plurality of spacing and connecting members, pivotal connecting means between the side members of the power-frame and the rearwardly-divergent arms of the intermediate member of the runner-frame, link connections between the hound members of the latter and the front ends of the side members of the power-frame, and means for adjusting and for retaining at the proper adjustment the runner-frame in its relation to the main frame.

10. A wheel-supported main frame, a runner-frame connected with the main frame and including the seed-dropping mechanism and rotary driving means for the same, a power-frame including suitably spaced and connected side members, a plurality of shafts journaled in the latter, parallel to each other, rotary ground-engaging means upon said shafts and means for connecting the latter to operate in unison, and means for transmitting motion from one of said shafts to the rotary driving-shaft of the seed-dropping mechanism.

11. In a corn-planter, operating means for the seed-dropping mechanism including a power-frame having a plurality of shafts carrying rotary ground-engaging members, means for connecting said shafts and causing them to rotate in unison, and means for transmitting motion from one of said shafts to the driven shaft, whereby the seed-dropping mechanism is actuated.

12. In a corn-planter, a power-frame including side members spaced and connected, a plurality of shafts journaled in said side members, earth-engaging members upon said shafts comprising radiating spokes provided at their outer ends with laterally-extending earth-engaging plates, cranks at the ends of the several shafts, and bars connecting said cranks on each side of the frame, thereby compelling the shafts to rotate in unison, said power-frame being disposed to trail in rear of the machine and to transmit power to the seed-dropping mechanism.

In testimony that I claim the foregoing as my own I have hereto affixed my signature in the presence of two witnesses.

JOHN J. HESER.

Witnesses:
JOSEPH KLARNER,
ROBERT STEINER.